(12) United States Patent
Brandt

(10) Patent No.: US 6,317,110 B1
(45) Date of Patent: Nov. 13, 2001

(54) METHOD FOR REPRESENTING VARIABLE INFORMATION BY COMBINATION OF LIQUID CRYSTAL DISPLAYS OF DIFFERENT SWITCHING TIMES

(75) Inventor: Peter Brandt, Babenhausen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/316,425

(22) Filed: May 21, 1999

(30) Foreign Application Priority Data

May 23, 1998 (DE) .............................................. 198 23 191
Apr. 7, 1999 (DE) .............................................. 199 15 622

(51) Int. Cl.⁷ .................................................. G09G 3/36
(52) U.S. Cl. .............................. 345/87; 345/38; 345/2.1; 345/2.2; 345/5; 345/101
(58) Field of Search ................................ 345/87, 38, 51, 345/2.1–2.2, 3.1, 5, 101, 4

(56) References Cited

U.S. PATENT DOCUMENTS

| | | | | |
|---|---|---|---|---|
| 4,236,155 | * | 11/1980 | Nagata ..................................... | 345/96 |
| 4,242,679 | * | 12/1980 | Morozumi et al. ...................... | 345/52 |
| 4,465,380 | * | 8/1984 | Murata et al. .......................... | 368/202 |
| 4,521,775 | | 6/1985 | Noble . | |
| 4,839,636 | * | 6/1989 | Zeiss ....................................... | 345/30 |
| 4,941,737 | * | 7/1990 | Kimura ................................... | 349/76 |
| 5,537,236 | * | 7/1996 | Young ..................................... | 349/139 |
| 5,666,186 | * | 9/1997 | Meyerhoefer et al. ................. | 396/281 |

FOREIGN PATENT DOCUMENTS 0626608   11/1994   (EP) .

* cited by examiner

*Primary Examiner*—Mark Zimmerman
*Assistant Examiner*—Mackly Monestime
(74) *Attorney, Agent, or Firm*—Martin A. Farber

(57) ABSTRACT

A invention relates to a method for representing variable information on a display device, in particular in a motor vehicle, having a first, dot matrix display having a liquid crystal cell, and having a second display having a liquid crystal cell, the second display being arranged optically in series with the first display, and the liquid crystal cell of the first display being driven using a multiplex method. In order to ensure reliable display of at least a partial volume of the information even at low temperatures, the partial volume of the information is represented on the first display with the liquid crystal cell driven using the multiplex method at an ambient temperature above a limit temperature and is represented on the second display arranged optically in series with the first display below the limit temperature, and the switching time, formed by the sum of switch-on time and switch-off time, of the liquid crystal cell of the second display is shorter than the switching time of the liquid crystal cell of the first display.

16 Claims, 4 Drawing Sheets

METHOD FOR REPRESENTING VARIABLE INFORMATION BY COMBINATION OF LIQUID CRYSTAL DISPLAYS OF DIFFERENT SWITCHING TIMES

FIELD AND BACKGROUND OF THE INVENTION

The invention relates to a method for representing variable information on a display device, in particular in a motor vehicle, having a first, dot matrix display having a liquid crystal cell, and having a second display having a liquid crystal cell, said second display being arranged optically in series with the first display, and the liquid crystal cell of the first display being driven using a multiplex method.

Methods of this type which serve to represent information on liquid crystal displays are known. In this case, two identical liquid crystal displays arranged optically in series are used in order to obtain a high image resolution and a high information density of the display by virtue of the superposition of representations of the two displays.

With the multiplex rate which is necessary for the driving in a multiplex method and rises with the number of image rows and columns present, not only does the necessary drive voltage change but also the switching time of the respective display, said switching time resulting from the sum of switch-on time and switch-off time. In this case, the switch-on time encompasses the period of time which elapses from the first drive pulse of a driven display segment until maximum contrast is reached between the driven character and its surroundings; the switch-off time, on the other hand, encompasses the period of time which passes from the cessation of the drive pulse until minimum contrast is reached between the character and its surroundings. The switching time of the display may be dependent on the liquid crystal substance used, the drive voltage and the driving method. Furthermore, there is a great dependence on the ambient temperature such that with falling ambient temperatures, the switching time of the display becomes very long. Therefore, it is not possible to reliably represent information on a display having a large number of dots at low ambient temperatures. This proves to be unacceptable particularly when safety-relevant information is represented by the display.

In order to remedy this deficient state of affairs, it is known, therefore, to provide a light box, serving to illuminate a liquid crystal cell in a liquid crystal display, with a heating wire. By means of the heating wire, the liquid crystal cell is heated and kept at a temperature level which enables the liquid crystal display to be operated with the requisite short switching times even at low ambient temperatures. On account of the relatively large distance between the heating wire and the liquid crystal cell, a high power supply and great heating of the heating wire are necessary in order to be able to generate the necessary heating of the liquid crystal cell. Furthermore, the heating wire heats the entire display unit, in an undesirable manner, on account of its arrangement in the light box and its required high radiation of heat.

SUMMARY OF THE INVENTION

The invention is based on the object of proposing a method for representing variable information of the type mentioned in the introduction by means of which a liquid crystal display device can not only represent a large volume of information during normal operation but can also represent a smaller partial volume of the information reliably and in a manner that still allows good reading in the event of operation at low ambient. temperatures. At the same time, the intention is to avoid undesirable heating of the display device.

This object is first achieved according to the invention by virtue of the fact that a partial volume of the information is represented on the first display. with the liquid crystal cell driven using the multiplex method at an ambient temperature above a limit temperature and is represented on the second display arranged optically in series with the first display below the limit temperature, and that the switching time, formed by the sum of switch-on time and switch-off time, of the liquid crystal cell of the second display is shorter than the switching time of the liquid crystal cell of the first display.

The abovementioned object is also achieved according to the invention by virtue of the fact that a partial volume of the information is represented on the first display with the liquid crystal cell driven using the multiplex method and simultaneously on the second display arranged optically in series with the first display at an ambient temperature above a limit temperature, that the partial volume of the information is represented exclusively on the second. display at an ambient temperature below the limit temperature, and that the switching time, formed by the sum of switch-on time and switch-off time, of the liquid crystal cell of the second display is shorter than the switching time of the liquid crystal cell of the first display.

With the aid of these two methods, it is not necessary to provide separate heating devices in the display device. Consequently, undesirable heating of parts of the display device which are not intended to be heated is precluded and additional provision of electrical power for the heating is not necessary. In addition to the presentation of a partial volume of the information, which is preferably safety-relevant information such as, for example, the display of a traveling speed in a motor vehicle, a large number of further items of information can be displayed at a sufficiently high ambient temperature, that is to say an ambient temperature which is above the limit temperature. This further information may include, in a motor vehicle, for example, service interval displays, function messages of electrical devices and generally informal information. At low temperatures below the limit temperature, the methods according to the invention ensure at least that basic information is represented. In this case, the limit temperature is chosen for instance such that, at temperatures which lie below it, easy and good readability of the first display with the longer switching time would no longer be ensured.

In accordance with the first-mentioned method, the partial volume of the information is in this case represented on the display with a longer switching time, but larger information density, above the limit temperature, whereas the representation is effected on the other display, having a shorter switching time, at a temperature below the limit temperature, it being accepted that in this case the total volume of information that can be represented is smaller.

By contrast, in accordance with the second-mentioned method, the partial volume of the information is represented on both displays at an ambient temperature above the limit temperature, the display with the longer switching times and the greater volume of information that can be represented being switched off when the limit temperature is exceeded in the direction of falling temperatures. A particularly uniform representation of the information on the two displays is achieved in this way.

In accordance with an advantageous development of the invention, the limit temperature comprises a temperature range having a lower limit and having an upper limit, as a result of which, in a manner that increases the readability of the display device, continual switching between the two displays in the case of an ambient temperature which fluctuates around the limit temperature is prevented. When customary liquid crystal substances are used and, in particular, when the display device is used in a motor vehicle, it proves to be favorable here if the lower limit of the temperature range is approximately minus 10° C. and the upper limit of the temperature range is approximately 0° C.

Particularly good readability of the display device can be achieved if at an ambient temperature above the lower limit of the temperature range and below the upper limit of the temperature range, the partial volume of the information is represented simultaneously on the first and on the second display.

The representation on the second display arranged optically in series with the first display can advantageously be matched to the first display, in a manner that simplifies the readability, if the second display is a dot matrix display. This additionally makes it possible to drive this display for flexible representation of information.

Driving the second display using a parallel driving method might be imagined. However, the number of drive lines of the second display can be reduced and a larger number of information items can nonetheless be represented if, in accordance with an advantageous development of the invention, the liquid crystal cell of the second display is driven using a multiplex method. In this case, the liquid crystal cell of the second display is preferably driven with a low multiplex rate, which ensures a short switching time, of at most 1:4. However, it is also conceivable to use an even smaller multiplex rate of 1:2, for example.

The volume of information that can be represented by the first display is advantageously large, in conjunction with a small number of drive lines, if the liquid crystal cell of the first display is driven with a multiplex rate of 1:64. Consequently, it is ensured that a large volume of information and a wide variety of information can be represented on this display.

In accordance with another advantageous development of the invention, the contrast of the display is particularly high if the liquid crystal cell of the first display is driven with a drive voltage of approximately 12 V.

It likewise serves to increase the display contrast if the liquid crystal cell of the second display is driven with a drive voltage preferably of approximately 5 V.

Particularly when the display device is used in a motor vehicle and when conventional liquid crystal substances are used, with customary drive voltages being used, it is particularly advantageous if the limit temperature is approximately 0° C.

In accordance with another advantageous development of the invention, the liquid crystal cell of the first display and/or the liquid crystal cell of the second display is an STN (super twisted nematic) cell. With STN cells, a particularly high contrast is obtained for the display, and, in addition, particularly short switching times can be achieved. This is advantageous particularly when the display device is used in a motor vehicle, since, in this case, it must be possible to read rapidly changing displays with a high degree of reliability. By virtue of the arrangement of two liquid crystal cells in series, color compensation is achieved when two identical cells are used, which color compensation may be necessary for the purpose of better readability particularly in the case of STN cells. Furthermore, STN cells can still be read entirely satisfactorily from a lateral viewing direction as well.

It could be imagined that a person viewing the display device would manually switch over the displays, or switch off the first display having a longer switching time, with a falling ambient temperature. However, the method according to the invention is particularly convenient when the ambient temperature is detected by means of a temperature sensor, the temperature sensor transmits an electrical signal corresponding to the ambient temperature to an electrical control device, and the control device, in accordance with the signal from the temperature sensor drives the liquid crystal cell of the first display and/or the liquid crystal cell of the second display in order to represent the partial volume of the information. In this way, a suitable driving of the display device is chosen automatically, as a result of which information need not be dispensed with unnecessarily nor is the reliable perceptibility of important displays cast into doubt.

A particularly high contrast and short switching times can advantageously be achieved with the display device if the liquid crystal cell of the first display and/or the liquid crystal cell of the second display has the substance MERCK ZLI-4431 as the liquid crystal substance.

Maximum structural integration of the elements of the display device for the method according to the invention can be achieved, in accordance with another advantageous development of the invention, by virtue of the fact that the first display, which can be driven using a multiplex method, and the second display form a multilayer liquid crystal display having at least two electrode layers on a respective substrate, which electrode layers are electrically isolated from one another and can be driven independently. Although such a design still has, functionally, two displays arranged optically in series, only a single liquid crystal cell with a front and a rear substrate, each carrying electrodes, is necessary for the purpose, a liquid crystal substance being enclosed between the substrates. It is particularly favorable, and it simplifies the design, if, in accordance with another advantageous development of the invention, the first display has in each case a first one of the electrode layers and the second display has in each case the second electrode layer of the substrates.

BRIEF DESCRIPTION OF THE DRAWINGS

The invention is explained in more detail below using exemplary embodiments which are illustrated in the accompanying drawings, in which.

DETAILED DESCRIPTION OF THE PREFERRED EMBODIMENTS

Figure 1A:
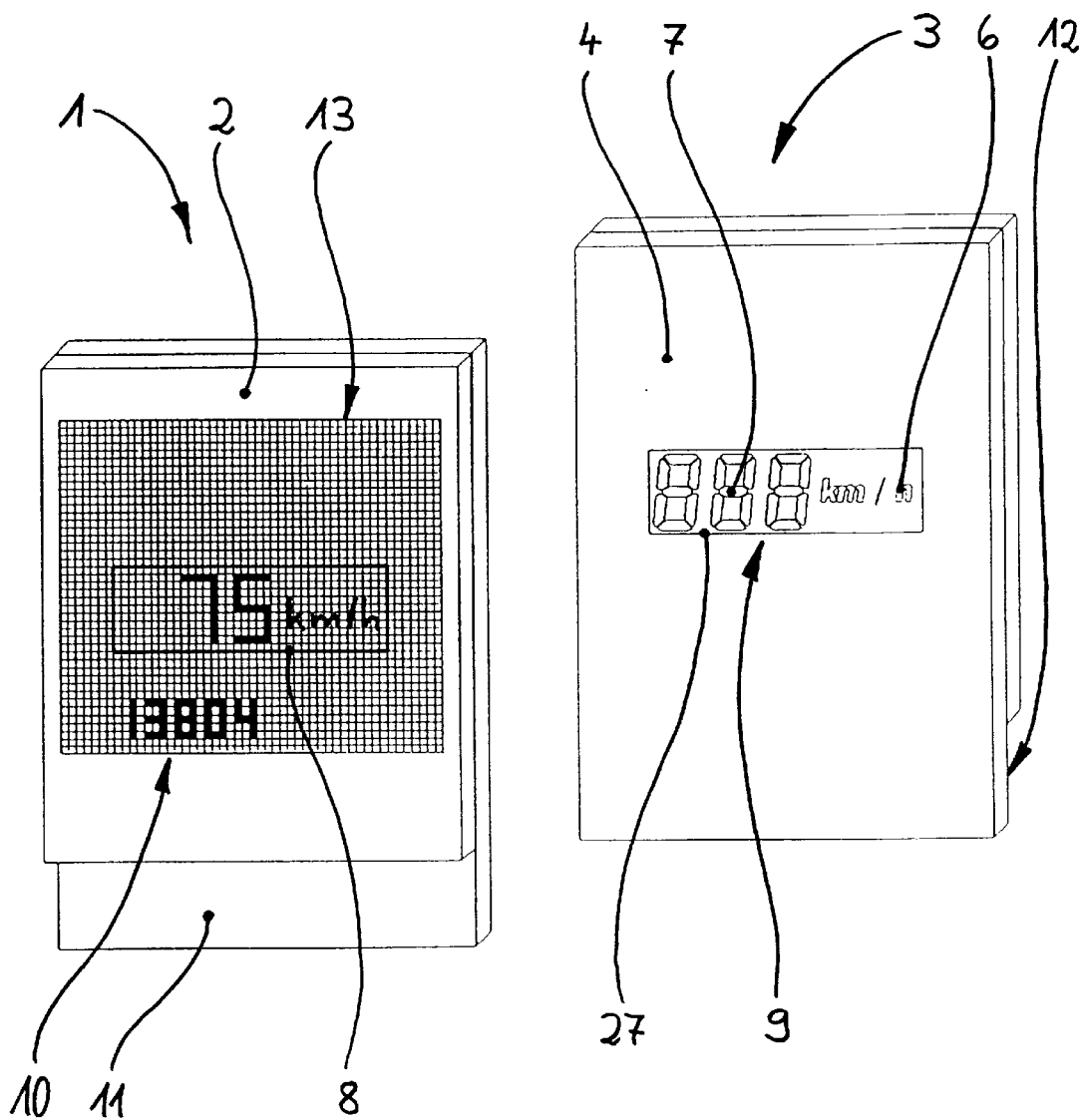
FIGS. 1a to 1c show two liquid crystal displays of a display device in various states of driving, in a perspective view.

FIG. 1a shows two liquid crystal displays 1, 3, arranged optically in series, of a display device (not illustrated in any further detail here) in a dashboard of a motor vehicle, in a perspective view. For reasons of clarity, the displays 1, 3 are not illustrated such that they are directly adjacent but rather such that they are spaced apart from one another. The liquid crystal display 1 is a dot matrix display having a liquid crystal cell 2, which has a contact area 11 for connection to a drive device and a display area 13 formed by a dot matrix.

Various items of information can be represented in the display area 13, a distance display 10 and, in a partial display area 8, a speed display 9 being represented here.

The second display 3, which has a shorter switching time than the display 1, has a liquid crystal cell 4 and a contact area 12 for connection to a drive device. A display area 27 of the liquid crystal cell 4 is arranged such that it can be brought into congruence with the partial display area 8 of the display 1. A speed display 9 can be represented in the display area 27, in a manner corresponding to the partial display area 8 of the first display 1. In the display area 27, the liquid crystal cell 4 has segments 7 of seven-segment arrangements for representing numerals and also segments 6 representing letters. In the illustration of FIG. 1a, the display device is driven such that nothing is displayed on the second display 3, whereas on the display 1 a traveling speed of 75 km/h is displayed in the partial display area 8 and a distance covered of 13804 (km) is displayed on the remaining zone of the display area 13. Corresponding driving of the displays 1, 3 is present at normal ambient temperatures of 20° C., for example.

Figure 1B:
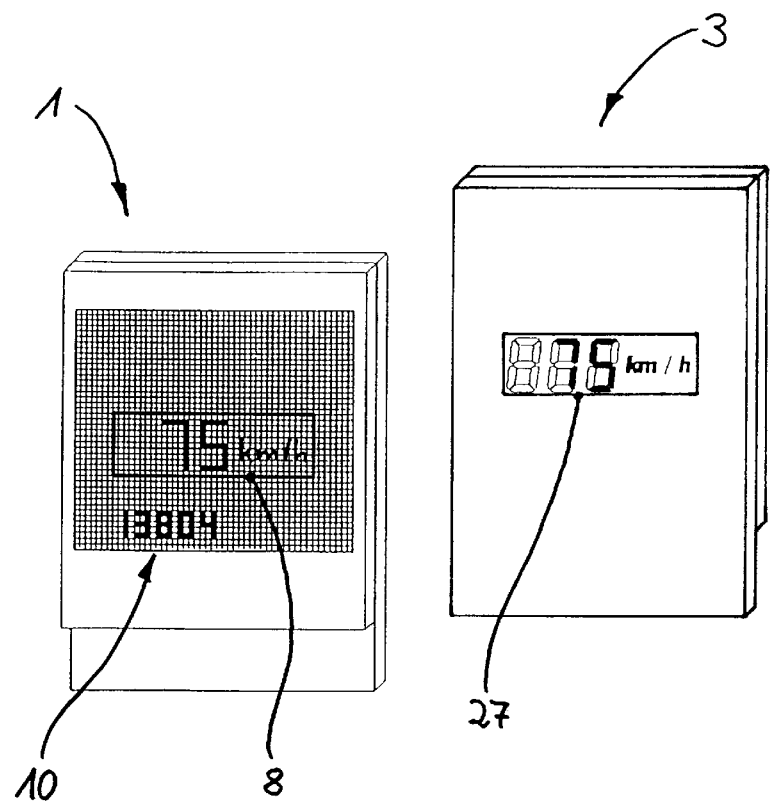

In the event of the displays 1, 3 being driven in the manner shown in FIG. 1b, the traveling speed of 75 km/h is represented both on the dot matrix display 1 and on the display 3, in the partial display area 8 and the display area 27, respectively. The distance display 10 is additionally represented on the display 1. The display device is driven in the manner corresponding to FIG. 1b in a transition or limit temperature range from e.g. 0° C. to minus 10° C.

Figure 1C:
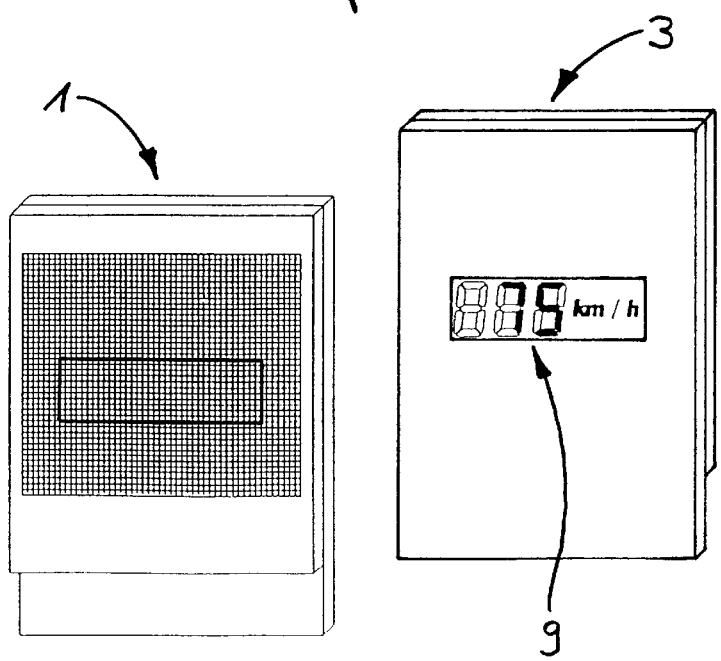

If the temperatures fall further, that is to say if an ambient temperature of less than the lower limit temperature of minus 10° C. is present, and if reliable representation is no longer possible on the dot matrix display 1 on account of the long switching time thereof, then, in accordance with FIG. 1c, only the second display 3, which has a short switching time, is driven. The safety-relevance partial information of the speed display 9 is now displayed still reliably and in a manner that allows good reading on the display 3.

Figure 2:
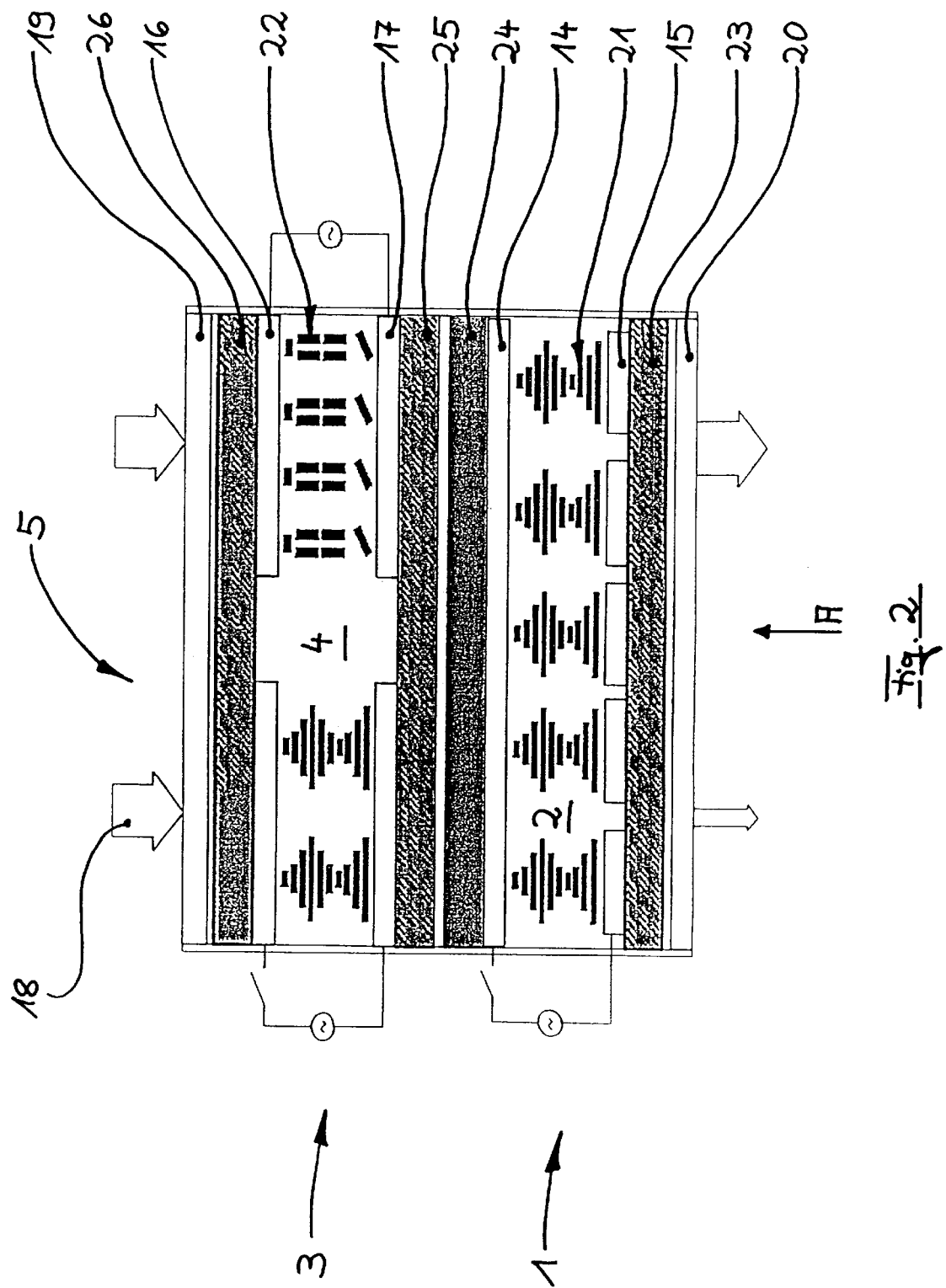
FIG. 2 shows a sectional view through a display device having two liquid crystal displays.

FIG. 2 shows a sectional view through a detail of a further display device 5 for a motor vehicle, components which correspond to the device from FIGS. 1a to 1c being provided with identical reference symbols.

Counter to a viewing direction A of the display device 5, a dot matrix display 1 having a liquid crystal cell 2 and a display 3 having a liquid crystal cell 4 are arranged optically in series. The displays 1, 3 are illuminated from the rear by illumination 18, symbolized with the aid of arrows. Both the liquid crystal cell 2 and the liquid crystal cell 4 are STN cells, disturbing color effects of the display thereby being compensated for. Such an arrangement of STN cells optically in series is also referred to as a DSTN cell. At its front and rear sides, the display 1 is respectively bounded by a front wall 23 and rear wall 24, formed by a glass plate in each case, strip-type rear electrodes 14 being provided on the rear wall 24 and strip-type front electrodes 15 being provided on the front wall 23. The rear electrodes 14 and the front electrodes 15 are rotated through 90° relative to one another, such that they form a dot matrix. By progressively driving the rear electrodes 14 (row electrodes) and the front electrodes 15 (column electrodes), liquid crystal substance 21 situated in between is oriented in accordance with the driving. The electrodes 14, 15 are not driven in the illustration of FIG. 2.

The second display 3 is respectively bounded by a front wall 25 and a rear wall 26, formed by a glass plate in each case. Mutually assigned front electrodes 17 and rear electrodes 16, forming segments, are respectively provided on the front wall 25 and the rear wall 26. When a driving voltage is applied to the electrodes 16, 17, as illustrated in the right-hand part of the display 3, liquid crystal substance 22 arranged between the electrodes is oriented in such a way that characters corresponding to the electrodes are represented. Polarizers 20, 19 are respectively arranged before the front wall 23 of the first display 1 and behind the rear wall 26 of the display 3.

Figure 3:
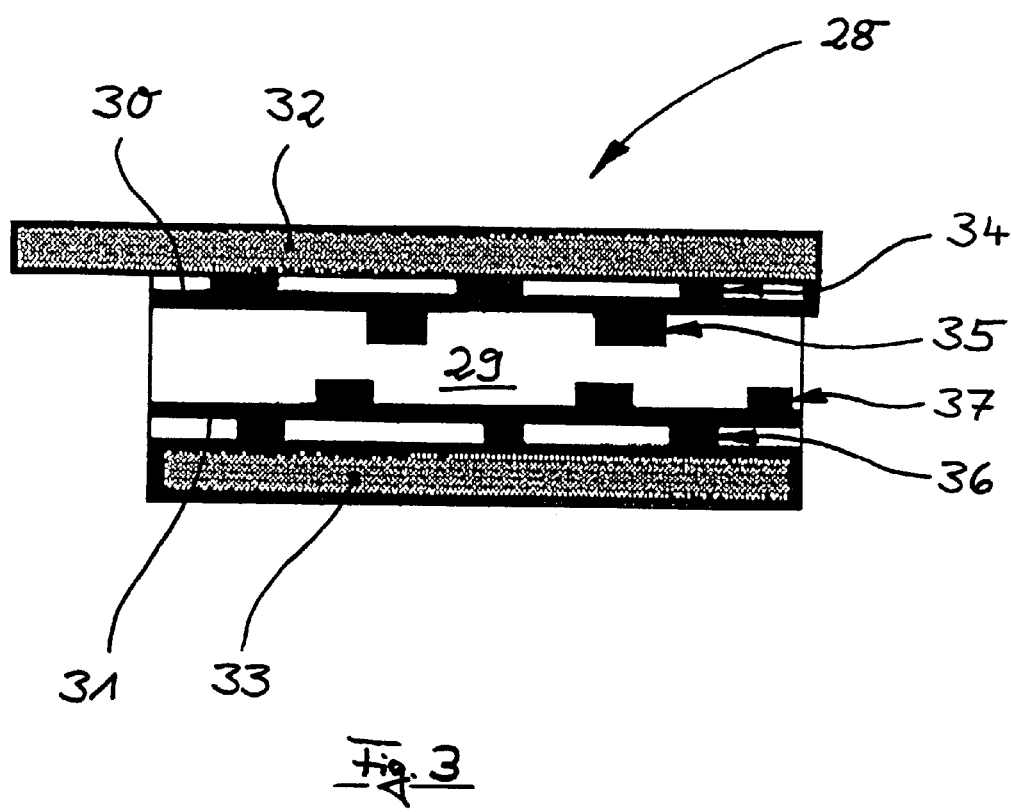
FIG. 3 shows a sectional view through a multilayer liquid crystal display of a further display device.

Instead of the two individual displays arranged optically in series as illustrated in the previous figures, it is possible, as illustrated in FIG. 3, to use a single multilayer liquid crystal display 28 for the display device. The display 28 has electrode layers 34, 35 which are applied on a front substrate 32, are isolated from one another by an insulation layer 30 and correspond to electrode layers 36, 37 which are applied to a rear substrate 33 and are electrically isolated from one another by an insulation layer 31. A liquid crystal substance is enclosed between the front substrate 32 and the rear substrate 33 in an interspace 29, the liquid crystal substance completely filling the interspace 29. Liquid crystal substance situated between respectively corresponding first electrode layers 34, 36 and second electrode layers 35, 37 can be driven by the application of electric voltage to selected electrodes.

What is claimed is:

1. A method for representing variable information on a display device, in particular in a motor vehicle, having a first, dot matrix display having a liquid crystal cell, and having a second display having a liquid crystal cell, said second display being arranged optically in series with the first display, and the liquid crystal cell of the first display being driven using a multiplex method, wherein a partial volume (9) of the information is represented on the first display (1) with the liquid crystal cell (2) driven using the multiplex method at an ambient temperature above a limit temperature and is represented on the second display (3) arranged optically in series with the first display (1) below the limit temperature, and wherein a switching time, formed by the sum of switch-on time and switch-off time, of the liquid crystal cell (4) of the second display (3) is shorter than the switching time of the liquid crystal cell (2) of the first display (1).

2. The method for representing variable information as claimed in claim 1, wherein the limit temperature comprises a temperature range having a lower limit and having an upper limit.

3. The method for representing variable information as claimed in claim 2, wherein the lower limit of the temperature range is minus 10° C. and the upper limit of the temperature range is minus 0° C.

4. The method for representing variable information as claimed in claim 2, wherein, at an ambient temperature above the lower limit of the temperature range and below the upper limit of the temperature range, the partial volume (9) of the information is represented simultaneously on the first (1) and on the second (3) display.

5. A method for representing variable information according to claim 1, wherein a partial volume (9) of the information is represented on the first display (1) with the liquid crystal cell (2) driven using the multiplex method and simultaneously on the second display (3) arranged optically in series with the first display (1) at an ambient temperature above a limit temperature, wherein the partial volume (9) of the information is represented exclusively on the second display (3) at an ambient temperature below the limit temperature, and wherein a switching time, formed by the sum of switch-on time and switch-off time, of the liquid crystal cell (4) of the second display (3) is shorter than the switching time of the liquid crystal cell (2) of the first display (1).

6. The method for representing variable information as claimed in claim 1, wherein the second display (3) is a dot matrix display.

7. The method for representing variable information as claimed in claim 1, wherein the liquid crystal cell (4) of the second display (3) is driven using a multiplex method.

8. The method for representing variable information as claimed in claim 7, wherein the liquid crystal cell (4) of the second display (3) is driven with a multiplex rate of at most 1:4.

9. The method for representing variable information as claimed in claim 1, wherein the liquid crystal cell (2) of the first display (1) is driven with a multiplex rate of 1:64.

10. The method for representing variable information as claimed in claim 1, wherein the liquid crystal cell (2) of the first display (1) is driven with a drive voltage of 12 V.

11. The method for representing variable information as claimed in claim 1, wherein the liquid crystal cell (4) of the second display (3) is driven with a drive voltage of 5 V.

12. The method for representing variable information as claimed in claim 1, wherein the limit temperature is 0° C.

13. The method for representing variable information as claimed in claim 1, wherein the liquid crystal cell (2) of the first display (1) and/or the liquid crystal cell (4) of the second display (3) is an STN (super twisted nematic) cell.

14. The method for representing variable information as claimed in claim 1, wherein the ambient temperature is detected by means of a temperature sensor, wherein the temperature sensor transmits an electrical signal corresponding to the ambient temperature to an electrical control device, and wherein the control device, in accordance with the signal from the temperature sensor drives the liquid crystal cell (2) of the first display (1) and/or the liquid crystal cell (4) of the second display (3) in order to represent the partial volume (9) of the information.

15. The method for representing variable information as claimed in claim 1, wherein the first display, which can be driven using a multiplex method, and the second display form a multilayer liquid crystal display (28) having at least two electrode layers (34, 35; 36, 37) on a respective substrate (32; 33), which electrode layers are electrically isolated from one another (insulation layer 30, 31) and can be driven independently.

16. The method for representing variable information as claimed in claim 15, wherein the first display has in each case in a first one of the electrode layers (34; 36) and the second display has in each case a second electrode layer (35; 37) of the substrates (32; 33).

* * * * *